United States Patent
Makin et al.

(10) Patent No.: US 6,183,661 B1
(45) Date of Patent: Feb. 6, 2001

(54) COMPOSITION COMPRISING A HYDROFLUOROALKANE OR HYDROCHLOROFLUOROALKANE AND A POLYETHER LUBRICANT

(75) Inventors: Pamela Louise Makin, Preston; Richard Llewellyn Powell, Tarporley, both of (GB)

(73) Assignee: Imperial Chemical Industries PLC, London (GB)

( * ) Notice: Under 35 U.S.C. 154(b), the term of this patent shall be extended for 0 days.

(21) Appl. No.: 08/589,305

(22) Filed: Jan. 22, 1996

Related U.S. Application Data

(63) Continuation of application No. 07/603,929, filed on Oct. 26, 1990, now abandoned.

(30) Foreign Application Priority Data

Oct. 25, 1989 (GB) .................................................. 8924057

(51) Int. Cl.$^7$ ..................................................... C09K 5/04
(52) U.S. Cl. ............................................. 252/68; 508/579
(58) Field of Search ............................. 252/67, 68, 52 A, 252/52 R; 508/579

(56) References Cited

U.S. PATENT DOCUMENTS

| | | | |
|---|---|---|---|
| 4,267,064 | * 5/1981 | Sasaki et al. | 252/52 A |
| 4,755,316 | * 7/1988 | Magid et al. | 252/52 A |
| 4,851,144 | * 7/1989 | McGraw et al. | 252/52 A |
| 4,900,463 | * 2/1990 | Thomas et al. | 252/68 |
| 4,948,525 | * 8/1990 | Sasaki et al. | 252/68 |
| 4,959,169 | * 9/1990 | McGraw et al. | 252/68 |
| 4,971,712 | * 11/1990 | Gorski et al. | 252/52 A |
| 4,975,212 | * 12/1990 | Thomas et al. | 252/68 |
| 5,021,180 | * 6/1991 | McGraw | 252/68 |
| 5,032,305 | * 7/1991 | Kamakura et al. | 252/68 |

FOREIGN PATENT DOCUMENTS

| | | |
|---|---|---|
| 0336171 | 10/1989 | (EP) . |
| 0377122 | 7/1990 | (EP) . |
| 1-259094 | * 10/1989 | (JP) . |
| 259094 | 10/1989 | (JP) . |

* cited by examiner

*Primary Examiner*—Alan Diamond
(74) *Attorney, Agent, or Firm*—Pillsbury Madison & Sutro LLP

(57) ABSTRACT

Refrigerant/lubricant compositions comprising a hydrofluoroalkane, e.g. R-134a, and a polyether which is the methyl encapped polooxypropylene ether of glycerol.

7 Claims, No Drawings

COMPOSITION COMPRISING A HYDROFLUOROALKANE OR HYDROCHLOROFLUOROALKANE AND A POLYETHER LUBRICANT

This is a continuation of Application Ser. No. 07/603,929, filed on Oct. 26, 1990 now abandoned, which was abandoned upon the filing hereof.

This invention relates to lubricants and more particularly to their use in heat transfer devices.

Heat transfer devices of the mechanical vapour recompression type, including refrigerators, heat pumps and air conditioning systems, are well known. In such devices, a working fluid of suitable boiling point evaporates at low pressure taking heat from the surrounding zone. The resulting vapour is then compressed and passed to a condenser where is condenses and gives off heat to a second zone. The condensate is then returned through an expansion valve to the evaporator, so completing the cycle. The mechanical energy required for compressing the vapour and pumping the fluid is provided by, for example, an electric motor or internal combustion engine.

The working fluid used in these heat transfer devices include chlorofluorocarbons such as dichlorodifluoromethane (Refrigerant R-12) the production of which is likely to be severely limited by international agreement in order to protect the stratospheric ozone layer. As is the case with other mechanical equipment, it is necessary for the moving parts of the heat transfer devices to be adequately lubricated and the devices are generally designed to use lubricants which are miscible with the working fluids, mineral oil commonly being used in conjunction with dichlorodifluoromethane.

Unfortunately, some of the compounds, for example 1, 1, 1, 2-tetrafluoroethane (R-134a), which have been proposed as working fluids to replace dichlorodifluoromethane are insufficiently soluble in mineral oils to allow the latter to be used as lubricants. Polyalkylene glycols have been proposed in U.S. Pat. No. 4,755,316 as alternatives but they are not entirely satisfactory for a number of reasons. Thus whilst they show reverse solubility such that the fluid tends to separate from the lubricant at temperatures above about 40° C., they often attract water to an extent sufficient to cause corrosion in the equipment. Furthermore, they often fail to wet metals sufficiently to provide efficient lubrication and have an adverse effect on aluminium commonly used for the construction of compressors.

The polyalkylene glycols described in U.S. Pat. No. 4,755,316 are at least difunctional with respect to the hydroxyl groups, polypropylene glycols being preferred. It is claimed that these polyether polyols are superior to polyoxypropylene glycol mono-ethers in that the polyols have significantly wider ranges of miscibility with 1, 1, 1, 2-tetrafluoroethane. In view of this claim that polyethers having at least two hydroxyl groups are superior to polyethers having one hydroxyl group, it is extremely surprising that polyethers which are substantially free of hydroxyl groups have now been found to be superior to polyether polyols in respect of their miscibilities with R-134a and related working fluids.

Thus according to the invention there is provided a composition for use in a compression type heat transfer device comprising:

a) a hydrofluoroalkane or hydrochlorofluoroalkane fluid; and
b) a sufficient amount to provide lubrication of a polyether having a molecular weight between about 150 and about 3000, said polyether having the general formula $$A[\!-\!(CH_2CHO)_n\!-\!Q]_x \quad\text{with R on CH} \tag{I}$$

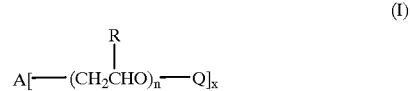

wherein
A represents the residue remaining after removing the active hydrogens from a compound containing one or more active hydrogen atoms;
R represents hydrogen or an alkyl radical;
Q represents an optionally substituted alkyl, aralkyl, or aryl radical; and
each of n and x, independently, is an integer having a value of at least 1.

Hydrofluoroalkanes and hydrochlorofluoroalkanes which may be present as working fluids in the compositions of the invention typically have boiling points in the range from about −85° C. to about 30° C. Examples of suitable hydrofluoroalkanes and hydrochlorofluoroalkanes are given in the following table:

| Refrigerant No. | Chemical Formula | Boiling Point ° C. at 1 bar |
|---|---|---|
| R-23 | $CHF_3$ | −82.1 |
| R-32 | $CH_2F_2$ | −51.7 |
| R-125 | $CHF_2CF_3$ | −48.5 |
| R-22 | $CHClF_2$ | −40.8 |
| R-134a | $CF_3CH_2F$ | −26.5 |
| R-152a | $CHF_2CH_3$ | −24.7 |
| R-134 | $CHF_2CHF_2$ | −19.7 |
| R-124 | $CHClFCF_3$ | −12 |
| R-124a | $CHF_2CClF_2$ | −10.2 |
| R-142b | $CClF_2CH_3$ | −9.2 |
| R-143 | $CHF_2CH_2F$ | 5 |
| R-133 | $CHClFCHF_2$ | 17 |
| R-123 | $CHCl_2CF_3$ | 27.2 |
| R-123a | $CHClFCClF_2$ | 28.2 |

A single hydrofluoroalkane or hydrochlorofluoroalkane may be employed as working fluid in the composition of the invention or alternatively, a mixture of hydrofluoroalkanes and/or hydrochlorofluoroalkanes may be used. Any such mixture may be azeotropes, zeotropes, (mixtures of varying boiling points) or close boiling point mixtures.

In the polyether of Formula I, A may represent the residue of any active hydrogen containing compound. Thus, for example, A may be the residue remaining after removing the active hydrogens from water, ammonia or a compound containing one or more hydroxyl, primary amino, secondary amino or mercapto groups.

Alkyl radicals which may be represented by R in the polyethers of Formula I particularly include $C_{1-4}$ alkyl radicals, especially methyl. The polyethers may be homopolymers, or alternatively, copolymers wherein, in any given molecule, R can be a mixture of hydrogen atoms and alkyl radicals arranged in a random or ordered manner.

Optionally substituted alkyl radicals which may be represented by Q include optionally substituted, for example halogen substituted, $C_{1-12}$ alkyl radicals especially $C_{1-4}$ alkyl radicals. Thus, especially suitable alkyl radicals include methyl, ethyl, the various propyl and butyl radicals, —$CF_2CF_2H$ and chlorobutyl. Aralkyl radicals which may be represented by Q particularly include benzyl and aryl radicals also include phenyl and alkyl substituted phenyl radicals.

Preferred polyethers for use in the compositions of the invention are polyoxyethylene ethers, polyoxypropylene ethers and random or block poly(oxyethyleneoxypropylene) ethers. In particularly preferred polyethers, at least 33% of the oxyalkylene units on a molar basis are oxyethylene units, any other oxyalkylene units being oxypropylene.

Another preferred class of polyethers for use in the compositions of the invention have the general formula:

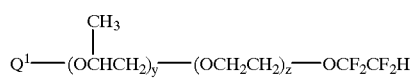
(II)

wherein
Q represents $C_{1-4}$ alkyl or —$CF_2CF_2H$;
each of y and z, independently, represents an integer from 0 to 15, the sum of y and z being from 4 to 15; and
the oxyethylene and oxypropylene units being randomly distributed.

Polyethers of Formula (I) may be obtained by etherification, under conventional conditions of a polyether of the formula:

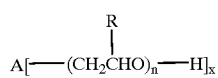
(III)

wherein A, R, n and x have the meanings given above.

Polyethers of Formula III have been fully described in the prior art and may be obtained by the oxyalkylation (especially oxyethylation and/or oxypropylation) of an initiator compound of the formula:

$AH_x$ (IV)

wherein A and x have the meanings given above.

Suitable initiator compounds of Formula IV include water, ammonia, mono- and polyhydric alcohols, for example methanol, ethanol, 1-butanol, 1-hexanol, 1-decanol, benzyl alcohol, cyclohexanol, ethylene glycol, propylene glycol, 1, 4-butanediol, 1, 6-hexanediol, diethylene glycol, dipropylene glycol, cyclohexane dimethanol, glycerol, 1, 2, 6-hexanetriol, trimethylolpropane, triethanolamine, pentaerythritol, dipentaerythritol, sorbitol and sucrose, phenols, for example phenol, cresols, nonylphenol, resorcinol and bisphenol A, amines, for example ethylamine, diethylamine, cyclohexylamine, aniline, ethylene diamine, hexamethylene diamine, tolylene diamine, diaminodiphenylmethane, polymethylene polyphenylene polyamines and amino-alcohols, for example ethanolamine and diethanolamine. Mixtures of initiators may be used.

The weight ratio of hydrofluoroalkane and/or hydrochlorofluoroalkane refrigerant to polyether lubricant in the compositions of the invention is generally within the range 99:1 to 1:99, preferably 99:1 to 70:30.

The compositions of the invention are useful in compression cycle heat transfer devices including refrigerators, air conditioning and heat pump systems and may be used for producing both cooling and heating.

The invention is illustrated but not limited by the following examples.

EXAMPLE 1

The viscosity, miscibility (at 15% w/w), and Falex pin and block wear performance of compositions wherein the lubricant was as defined according to Formula I were conducted.

COMPARATIVE EXAMPLE 1

The viscosity, miscibility (at 15% w/w), and Falex pin and block wear performance of composition wherein the lubricant according to Formula I terminated in hydroxyl groups was conducted.

In Example 1, and Comparative Example 1 the following experimental methods were used to determine the miscibility of each lubricant with refrigerant R-134a.

For determination of the miscibility at temperatures below 60° C., 2 to 3g of the lubricant was placed in a 25 cm³ capacity thick walled pressure resistant glass bottle. The bottle was sealed using a sealing valve, and then evacuated with a vacuum pump. Sufficient refrigerant, R-134a, is then transferred into the bottle through the sealing valve to produce a mixture of the required concentration.

Whilst in the bottle, the mixture is heated in a thermostatically controlled bath, and agitated to maintain a uniform concentration. The temperature at which the mixture justs starts to go cloudy is noted as the "cloud point". At this temperature, the mixture is beginning to separate into 2 liquid phases and thus represents the limit of miscibility of the refrigerant/lubricant mixture at that concentration.

For determination of the miscibility at temperatures above 60° C. it is preferred that, due to the higher pressures generated, a high pressure cell, rated to 40 bars, is used instead of the glass bottle. The cell comprises a thick walled steel body capped with a thick glass window. The cell is also equipped with an electric heater, filling valve and thermocouple. The experimental procedure is essentially the same as that for the glass bottle.

The results of Example 1 and Comparative Example 1 are shown in Tables 1 and 2 respectively, wherein the following nomenclature has been used.

EO - ethylene oxide units  PO - propylene oxide units
Me - methyl endcapped polyether  OH - hydroxyl endcapped polyether Ratio, e.g. 25/75, refers to the EO/PO content in molar terms. St/St—Steel/Steel couple Al/Sc—Aluminium/Steel couple From these results it can be seen that for polyethers having the same viscosity, and composition, those which are encapped show improved miscibility with the refrigerant.

EXAMPLE 1

TABLE 1

| | | Viscosity at 40° C. [cSt] | Cloud Point [° C.] | Failure Load St/St (lbs) | Loss Al/St (g) |
|---|---|---|---|---|---|
| Butanol-(50/50 EO/PO)-Me | (1) | 33 | 71 | | |
| | (2) | 46 | 64 | | |
| | (3) | 70 | 53 | | |

TABLE 1-continued

| | Viscosity at 40° C. [cSt] | Cloud Point [° C.] | Failure Load St/St (lbs) | Loss Al/St (g) |
|---|---|---|---|---|
| Butanol-(0/100 EO/PO)-Me | 32 | >ND | 977 | .0221 |
| Glycerol-(25/75 EO/PO)-Me | 100 | 56 | 875 | .1777 |
| Glycerol-(0/100 EO/PO)-Me | 58 | 60 | | |

COMPARATIVE EXAMPLE 1

TABLE 2

| | | Viscosity at 40° C. [cSt] | Cloud Point [° C.] | Failure Load St/St (lbs) | Loss Al/St (g) |
|---|---|---|---|---|---|
| Butanol-(50/50 EO/PO)-OH | (1) | 33 | 64 | | |
| | (2) | 46 | 56 | | |
| | (3) | 70 | 44 | | |
| | (4) | 100 | 38 | | |
| Butanol-(0/100 EO/PO)-OH | (1) | 32 | 70 | 1175 | .1900 |
| | (2) | 58 | 36 | | |
| Glycerol-(25/75 EO/PO)-OH | | 100 | 38 | 825 | .4179 |

EXAMPLE 2

The Falex pin and block performance was evaluated on a butanol initiated, 100% PO, methyl encapped polyether in the presence of 1% tricresyl phosphate.

The load to fail was 1200 lbs, and the weight loss was 0.0038 grammes.

COMPARATIVE EXAMPLE 2

Example 2 was repeated using the corresponding hydroxyl terminated polyether.

The load to fail was 1175 lbs, and the weight loss was 1457 grammes.

What is claimed is:

1. In a composition for use in a compression type heat transfer device comprising:
   (a) a working fluid consisting essentially of at least one hydrofluoroalkane; and
   (b) a lubricant, the improvement wherein the lubricant consists essentially of a sufficient amount to provide lubrication of a polyether having a molecular weight between about 150 and about 3000, said polyether having the general formula

wherein
A represents the radical remaining after removing the active hydrogens from glycerol;
R represents methyl or mixture of hydrogen and methyl;
Q represents methyl;
x is 1 or 3; and
n is an integer having a value of at least 1.

2. A composition as claimed in claim 1 wherein the weight ratio of hydrofluoroalkane to polyether in the composition is within the range 99:1 to 1:99.

3. A composition as claimed in claim 1 wherein the at least one hydrofluoroalkane is selected from the group consisting of R-23 ($CHF_3$), R-32 ($CH_2F_2$), R-125 ($CF_3CF_2H$), R-134a ($CF_3CFH_2$), R-152a ($CF_2HCH_3$), R-134 ($CF_2HCH_2H$), and R-143 ($CF_2HCFH_2$).

4. A composition as claimed in claim 1 wherein the working fluid consists essentially of R-134a.

5. A composition comprising:
   (a) a working fluid consisting essentially of at least one hydrofluoroalkane; and
   (b) a lubricant consisting essentially of a sufficient amount to provide lubrication of a polyether having a molecular weight between about 150 and about 3000 said polyether having the general formula

wherein
R represents a mixture of hydrogen and methyl;
Q represents methyl; n is an integer having a value of at least 2;
wherein the group A in the polyether is the radical remaining after removing the active hydrogens from butanol and x is 1.

6. A composition comprising:
   (a) a working fluid consisting essentially of at least one hydrofluoroalkane; and
   (b) a lubricant the improvement wherein the lubricant consists essentially of a sufficient amount to provide lubrication of a polyether having a molecular weight between about 150 and about 3000, said polyether having the general formula

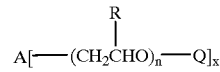

wherein
A represents the radical remaining after removing the active hydrogens from glycerol or butanol;
R represents a mixture of hydrogen and methyl;
Q represents methyl;
x is 1 or 3; and
wherein n is an integer of at least 2 and the polyether is a copolymer comprising oxyethylene and oxypropylene units.

7. A composition comprising a working fluid consisting essentially of R-134a and a lubricating amount of a polyether of the formula

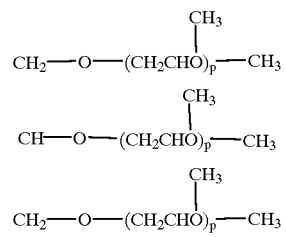

wherein each p is an integer which may be the same or different, such that the viscosity of the polyether at 40° C. is at least 100 cSt.

* * * * *